United States Patent [19]

Ikedo et al.

[11] Patent Number: 5,226,032
[45] Date of Patent: Jul. 6, 1993

[54] DISK PLAYER HAVING A PLURALITY OF MOVABLE DISK HOLDING TRAYS

[75] Inventors: Yuji Ikedo; Yusuke Akama, both of Saitama, Japan

[73] Assignee: Pioneer Electronic Corporation, Tokyo, Japan

[21] Appl. No.: 765,736

[22] Filed: Sep. 26, 1991

[30] Foreign Application Priority Data

Oct. 8, 1990 [JP] Japan .................................. 2-269973

[51] Int. Cl.⁵ ........................ G11B 17/08; G11B 33/14
[52] U.S. Cl. .................................... 369/178; 369/192; 369/181; 360/97.03; 360/98.01
[58] Field of Search ............... 369/178, 181, 192, 194, 369/215, 36, 75.2; 360/98.01, 97.03

[56] References Cited

U.S. PATENT DOCUMENTS 4,682,313 7/1987 Miyake ................................ 369/194
4,797,865 1/1989 Imai et al. ............................ 369/36

FOREIGN PATENT DOCUMENTS 0330731 1/1991 European Pat. Off. .

OTHER PUBLICATIONS

Patent Abstracts of Japan, vol. 12, No. 284 (P-740) Aug. 4, 1988.
Patent Abstracts of Japan, vol. 8, No. 60 (P-262) Mar. 22, 1984.
Patent Abstracts of Japan, vol. 10, No. 254 (P-492) Aug. 30, 1986.
Patent Abstracts of Japan, vol. 11, No. 283 (P-615) Sep. 12, 1987.

Primary Examiner—Paul M. Dzierzynski
Assistant Examiner—Don Wong
Attorney, Agent, or Firm—Sughrue, Mion, Zinn, Macpeak & Seas

[57] ABSTRACT

A disk player includes a player housing. A turntable and a plurality of trays in which corresponding disks are detachably placed are disposed in the player housing. The trays are juxtaposed in such a manner that the surfaces of the trays are substantially in parallel with the disk bearing surface of the turntable. The disk player further includes a circular gear section for moving the plurality of trays to a playing position, a waiting position, and an ejecting position; and a drive section for rotating the circular gear section. Further, a circular cam mechanism is engaged with the circular gear so as to be turned thereby, the circular cam mechanism having cam section for moving a pickup section vertically in accordance with the position of the disk at the playing position.

5 Claims, 18 Drawing Sheets

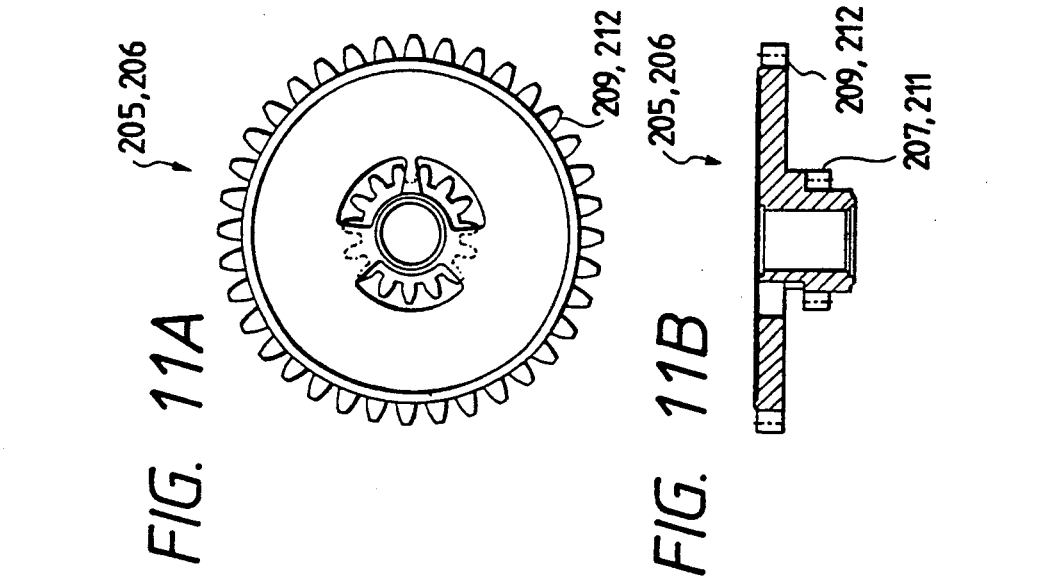
FIG. 11A
FIG. 11B
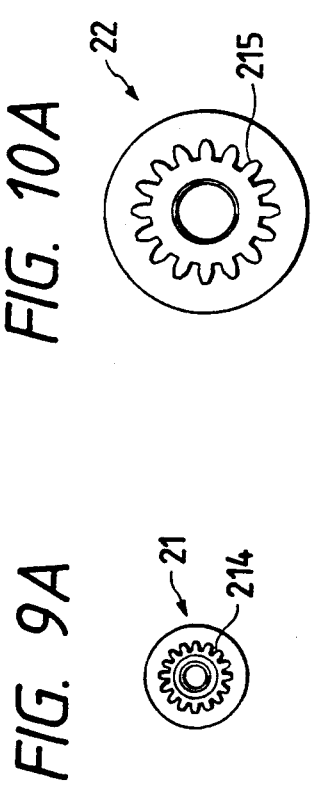
FIG. 9A
FIG. 9B
FIG. 9C
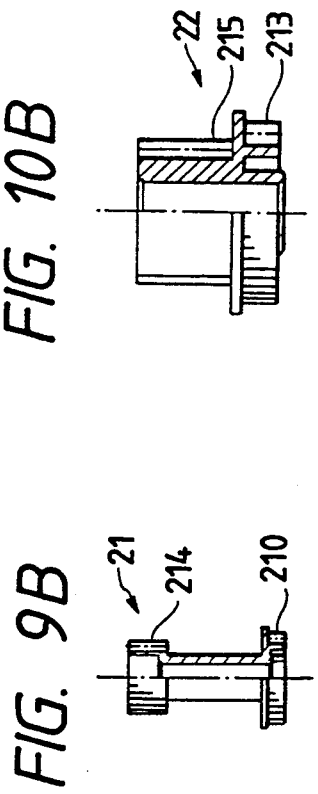
FIG. 10A
FIG. 10B
FIG. 10C

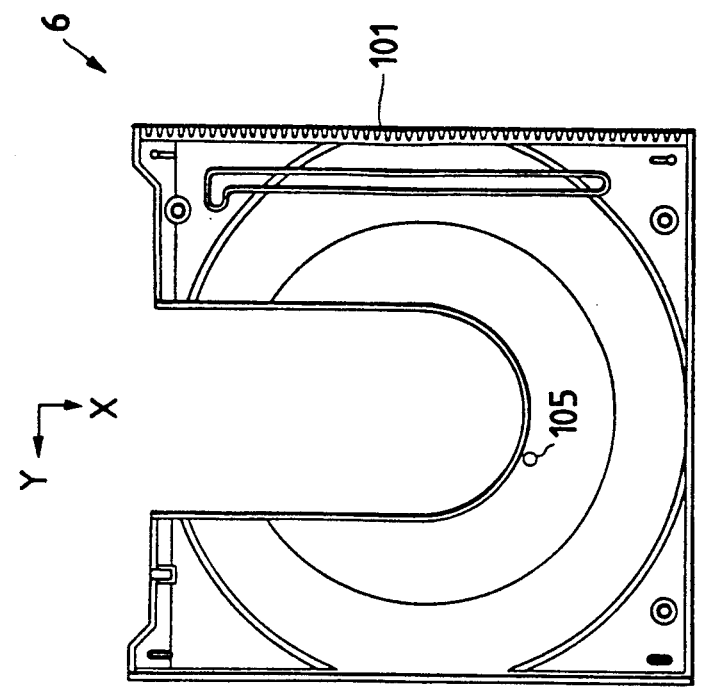
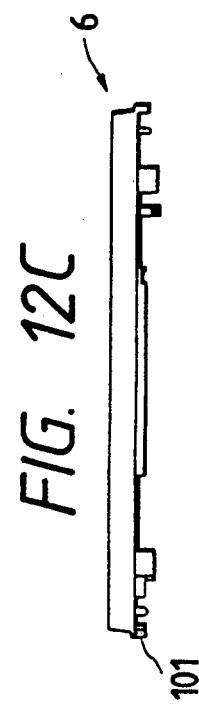
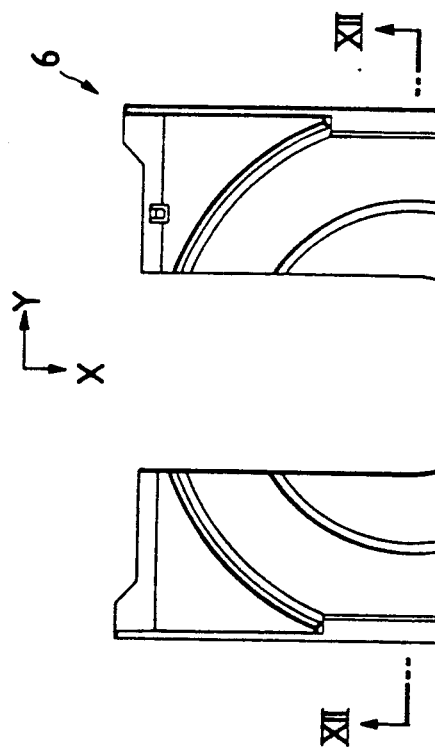
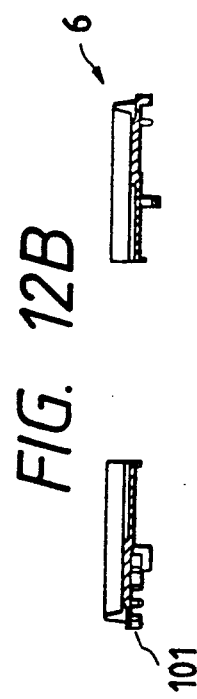

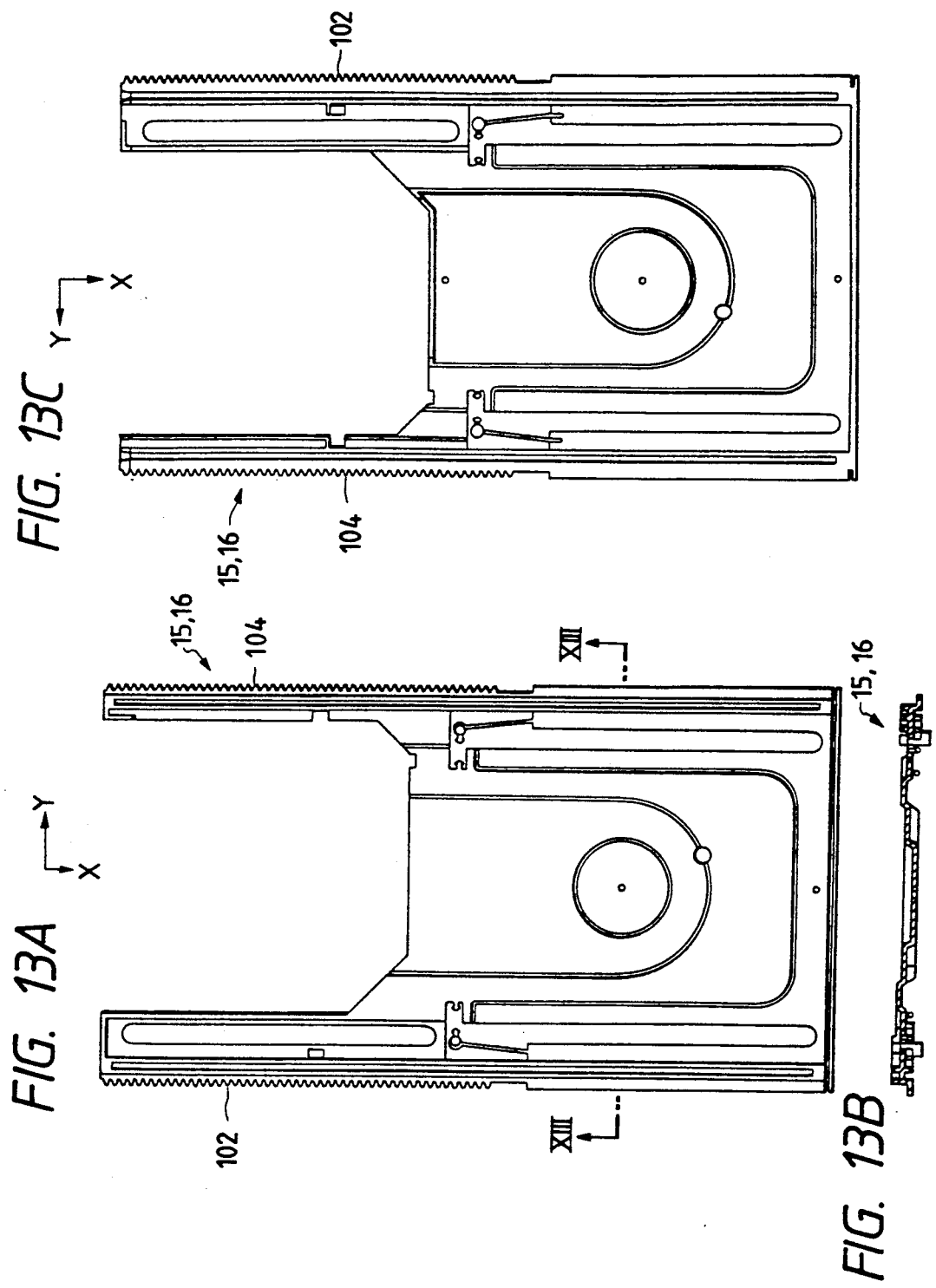

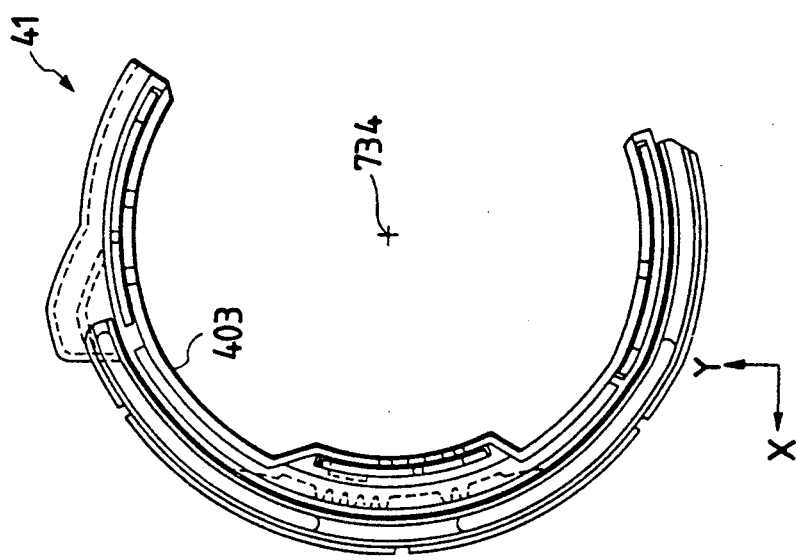
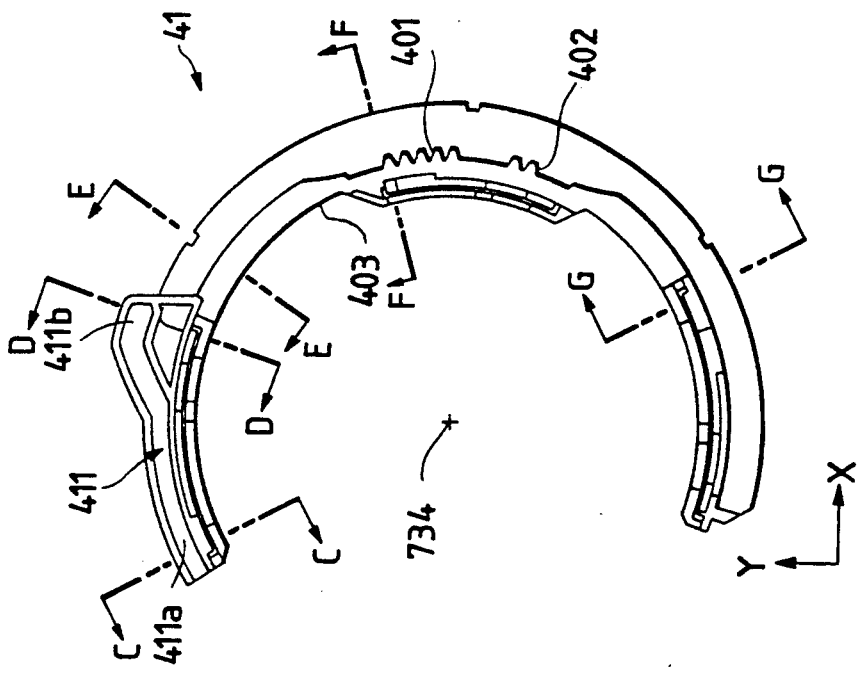

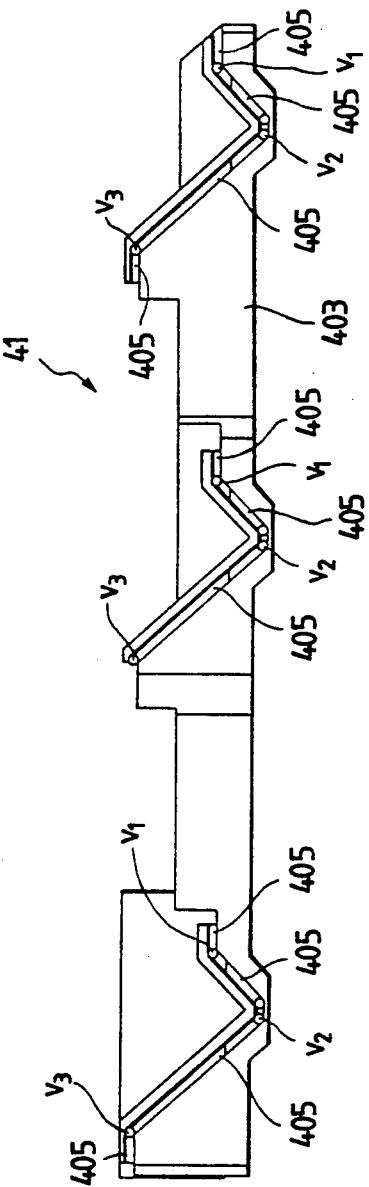
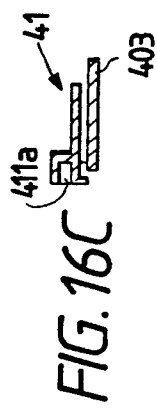
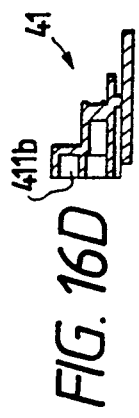
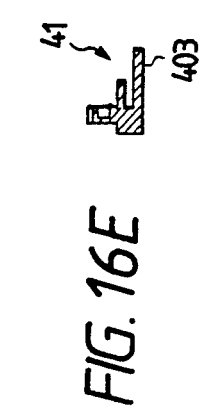
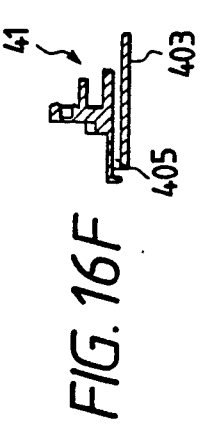
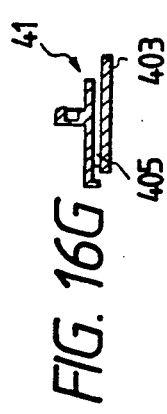

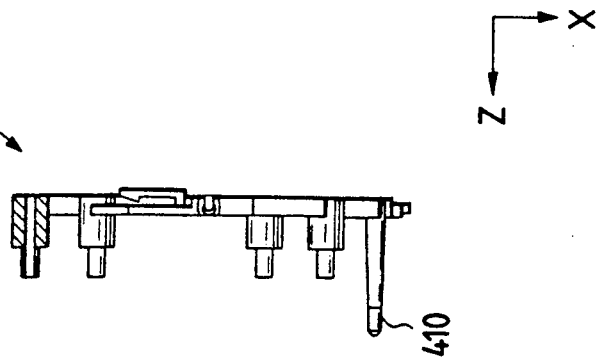
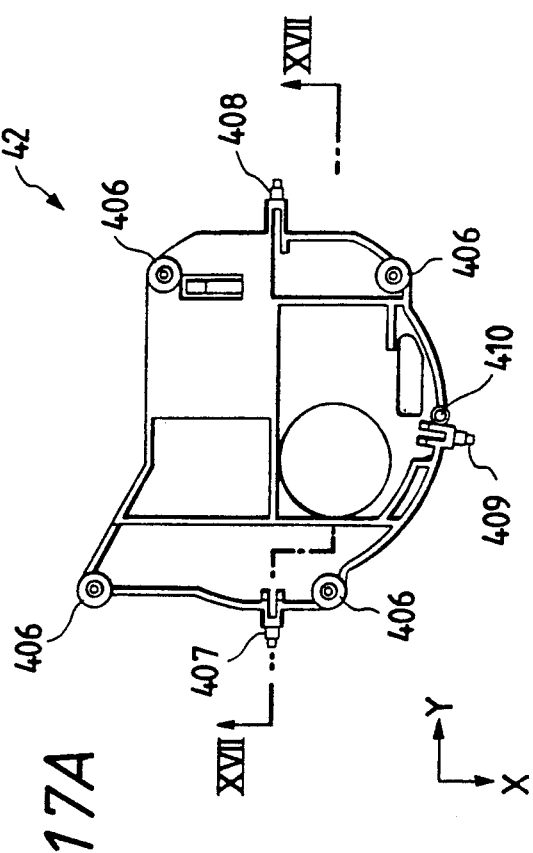
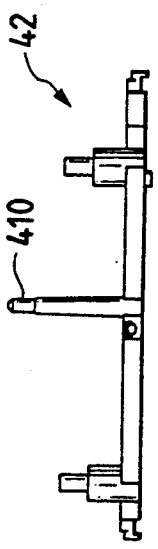
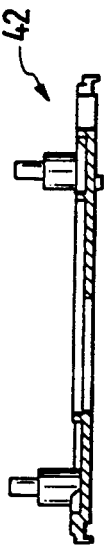
FIG. 17D
FIG. 17A
FIG. 17B
FIG. 17C

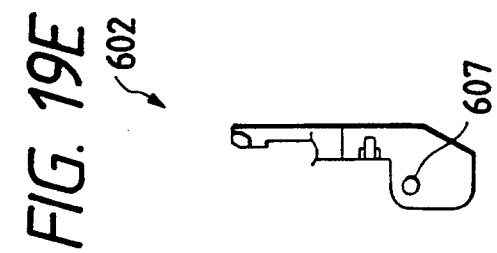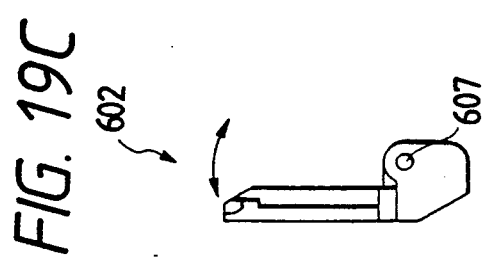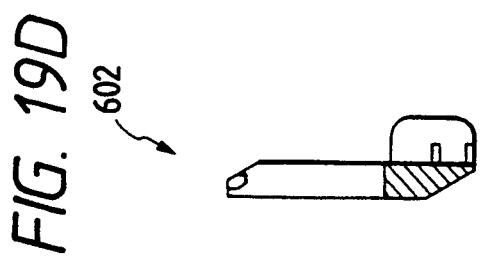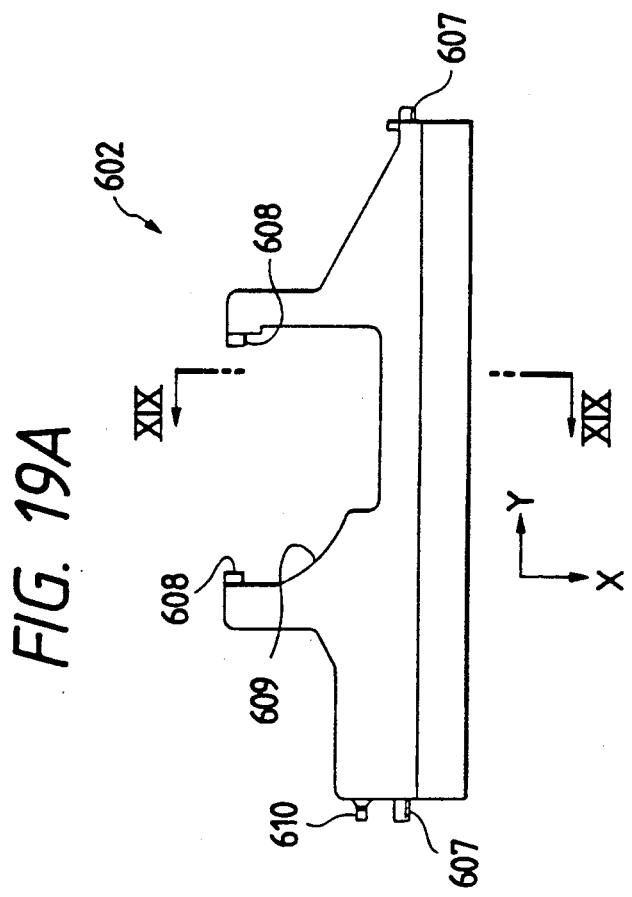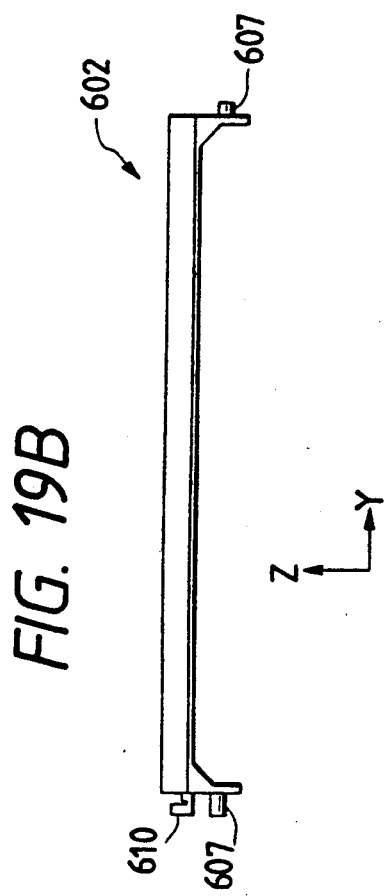

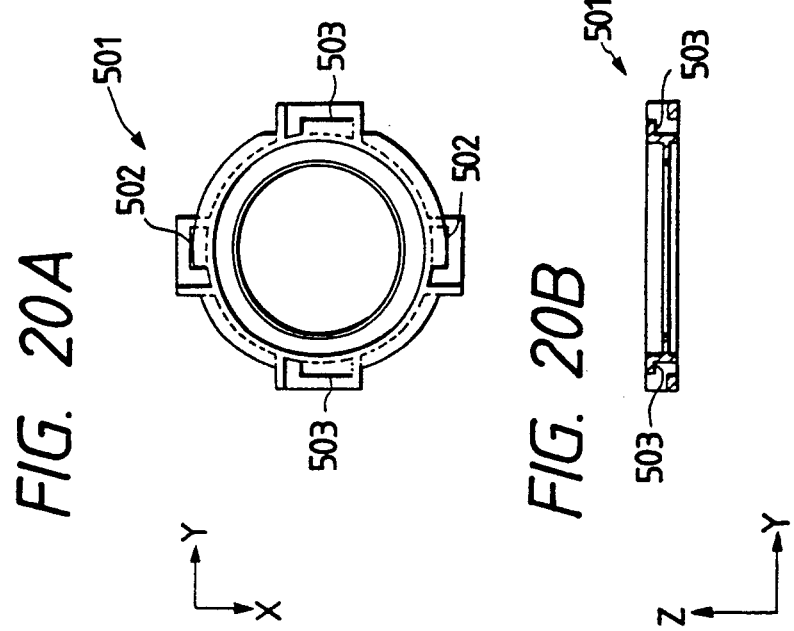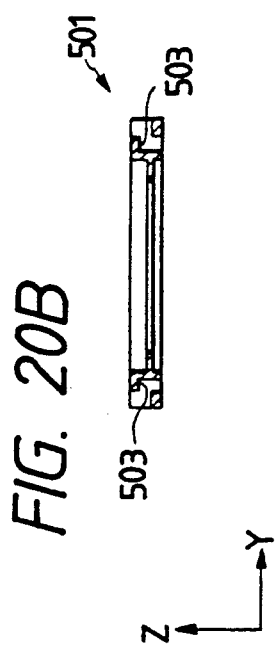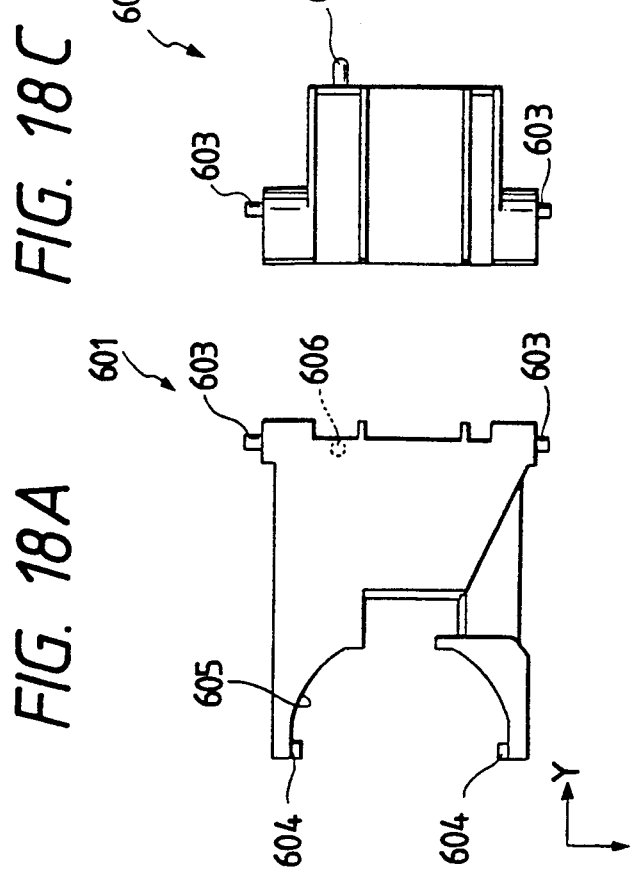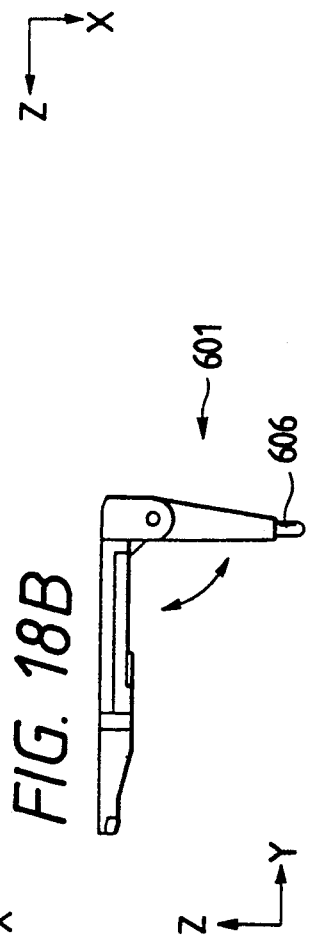

DISK PLAYER HAVING A PLURALITY OF MOVABLE DISK HOLDING TRAYS

BACKGROUND OF THE INVENTION

This invention relates to a disk player for playing disks such as musical performance disks.

In playing a plurality of compact disks with a disk player, it is necessary to replace the disks successively. The replacement of the disks is rather troublesome. In order to eliminate this difficulty, recently a disk player has been proposed in the art in which disk bearing trays (hereinafter referred to merely as "trays" or "disk trays", when applicable) are provided in two layers to play a plurality of compact disks successively.

A disk player of this type has been disclosed by Japanese Patent Application (OPI) No. 224969/1989 (the term "OPI" as used herein means an "unexamined published application"). The disk player is designed as follows: two disk trays are juxtaposed in such a manner that one of the two disk trays is located above the other. The trays are engaged with the cam grooves of a pair of rack members which are laid in the front-to-rear direction of the player housing. As the rack members move back and forth, the cam grooves move the trays thereby to move the disks on the trays to the playing position, the waiting position, and the ejecting position. Further, in the above-noted disk player, a mechanism which includes an optical pickup section for reading data from disks is fixed; that is, it cannot be moved vertically. Hence, the cam grooves are so designed as to move the trays vertically to the playing position.

As was described above, in the conventional disk player, the trays are moved back and forth while being engaged with the cam grooves of the rack members, and the trays are moved vertically to the playing position with the aid of the cam grooves. Hence, the trays necessarily have a long backward and forward stroke; that is, the disk player itself is large in length.

Furthermore, in the conventional disk player, it is necessary to provide a pair of the rack members with the cam grooves on each of the right and left side walls of the casing. Hence, the disk player, requiring a large number of components, is intricate in construction.

SUMMARY OF THE INVENTION

Accordingly, an object of the present invention is to eliminate the above-described difficulties accompanying a conventional disk player. More specifically, an object of the invention is to provide a disk player which is smaller in length, compact in structure, and smaller in the number of components.

A disk player according to the present invention comprises: a circular gear section for moving a plurality of trays, on which disks are detachably placed, to a playing position, a waiting position, and an ejecting position. The trays are juxtaposed in such a manner that the surfaces of the trays are substantially in parallel with the disk bearing surface of a turntable in a player housing. The disk player further includes a drive section for rotating the circular gear section; and a circular cam mechanism engaged with the circular gear so as to be turned, the circular cam mechanism having a cam section for moving a pickup section vertically in accordance with the position of the disk at the playing position.

In the disk player, the trays are movably mounted on sub-trays, respectively, and pinion gears turned by a circular gear in the circular gear section are engaged with the trays and sub-trays so that the trays and sub-trays are moved as the circular gear turns.

Further, in the disk player, the cam section of the circular cam mechanism is adapted to move a clamper section vertically which is adapted to clamp the disk.

In the disk player, a clamper lifting mechanism for moving the clamper section vertically comprises a clamper arm section which supports the clamper section and engages with the cam section of the circular cam mechanism, in such a manner that, as a circular cam forming the circular cam mechanism turns, the clamper arm section is swung to move the clamper section vertically.

In the disk player of the present invention, the circular gear, which is continuously rotated by a motor, has gear teeth trains which are separated from one another, and the circular cam driven by the circular gear also has gear teeth trains which are separated from one another. Therefore, as the circular gear is turned, the trays are moved back and forth to the predetermined positions in synchronization with the gear teeth trains of the circular gear. With the aid of the cam section of the circular cam, the pickup section and the turntable are moved upwardly or downwardly in accordance with the position of the disk at the playing position. In addition, the clamper lifting mechanism, engaging with the cam section of the circular cam, is swung to move the clamper section adapted to hold the disk on the turntable.

BRIEF DESCRIPTION OF THE DRAWINGS

An example of a disk player, which constitutes an embodiment of the present invention, will be described with reference to the accompanying drawings.

FIGS. 9A, 9B and 9C are a top view, an elevation with its one half in vertical section, and a bottom view, respectively, of a first pinion gear in the disk player;

FIGS. 10A, 10B and 10C are a top view, an elevation with its one half in vertical section, and a bottom view, respectively, of a second pinion gear in the disk player;

FIGS. 11A and 11B are a plan view, and a sectional front view of a follower gear, respectively;

FIG. 12A is a plan view of an upper tray, and FIG. 12B is a sectional view taken along line XII—XII in FIG. 12A;

FIGS. 12C and 12D are a front view and a bottom view of the upper tray, respectively;

FIG. 13A is a plan view of an upper sub-tray (or a lower sub-tray);

FIG. 13B is a sectional view taken along line XIII—XIII in FIG. 13A, and FIG. 13C is a bottom view of the same;

FIGS. 16A through 16H show a circular cam. More specifically, FIGS. 16A and 16B are a top view and a bottom view of the circular cam, respectively, FIGS. 16C through 16G are sectional views taken along lines C—C, D—D, E—E, F—F and G—G in FIG. 16A, respectively, and FIG. 16H is a diagram of the circular cam unfolded with the point 734 as the center;

FIGS. 17A and 17B are a plan view and a front view of a float base, respectively;

FIG. 17C is a sectional view taken along line XVII—XVII in FIG. 17A;

FIG. 17D is a side view of the float base;

FIGS. 18A, 18B and 18C are a plan view, a front view, and a side view of a first clamper arm, respectively;

FIGS. 19A, 19B and 19C are a plan view, a front view, and a right side view of a second clamper arm, respectively;

FIG. 19D is a sectional view taken along line XIX—XIX in FIG. 19A, and FIG. 19E is a left side view of the second clamper arm;

FIGS. 20A and 20B are a plan view and a sectional front view of a clamper holder, respectively.

DETAILED DESCRIPTION OF THE PREFERRED EMBODIMENTS

Figure 1:
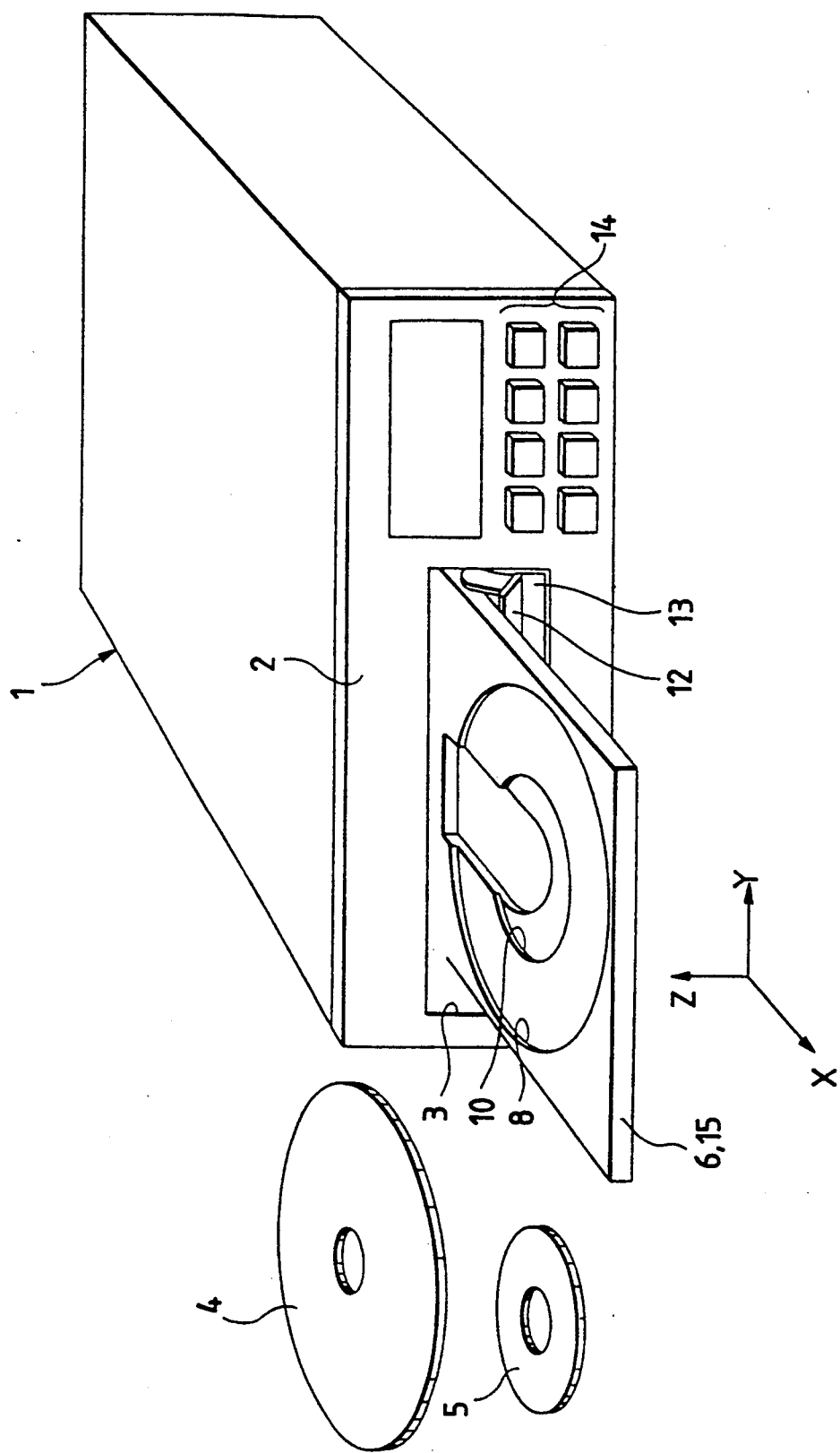
FIG. 1 is a perspective view showing a disk player which constitutes one embodiment of this invention.
Figure 2:
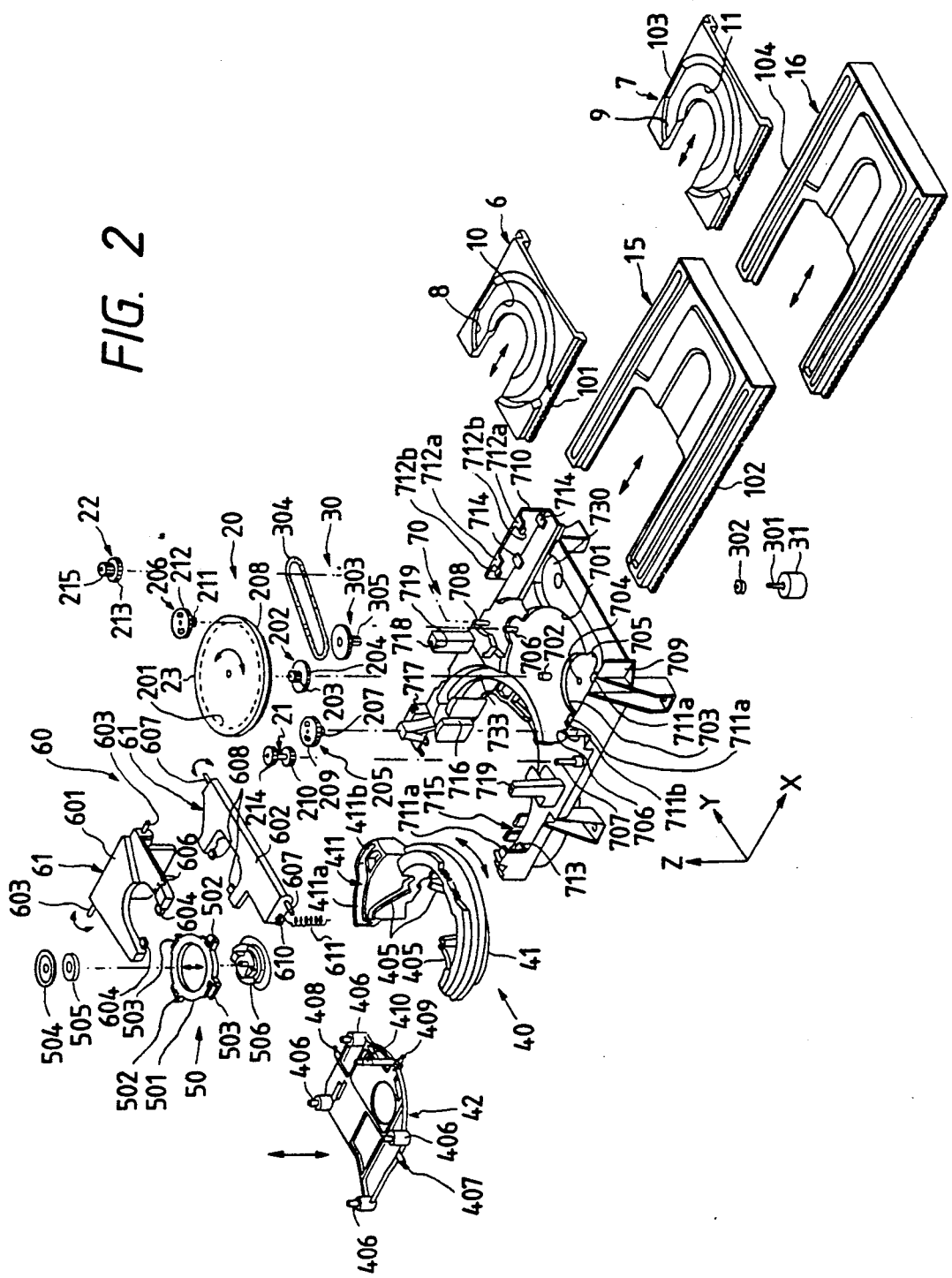
FIG. 2 is an exploded perspective view of the disk player.
Figure 3:
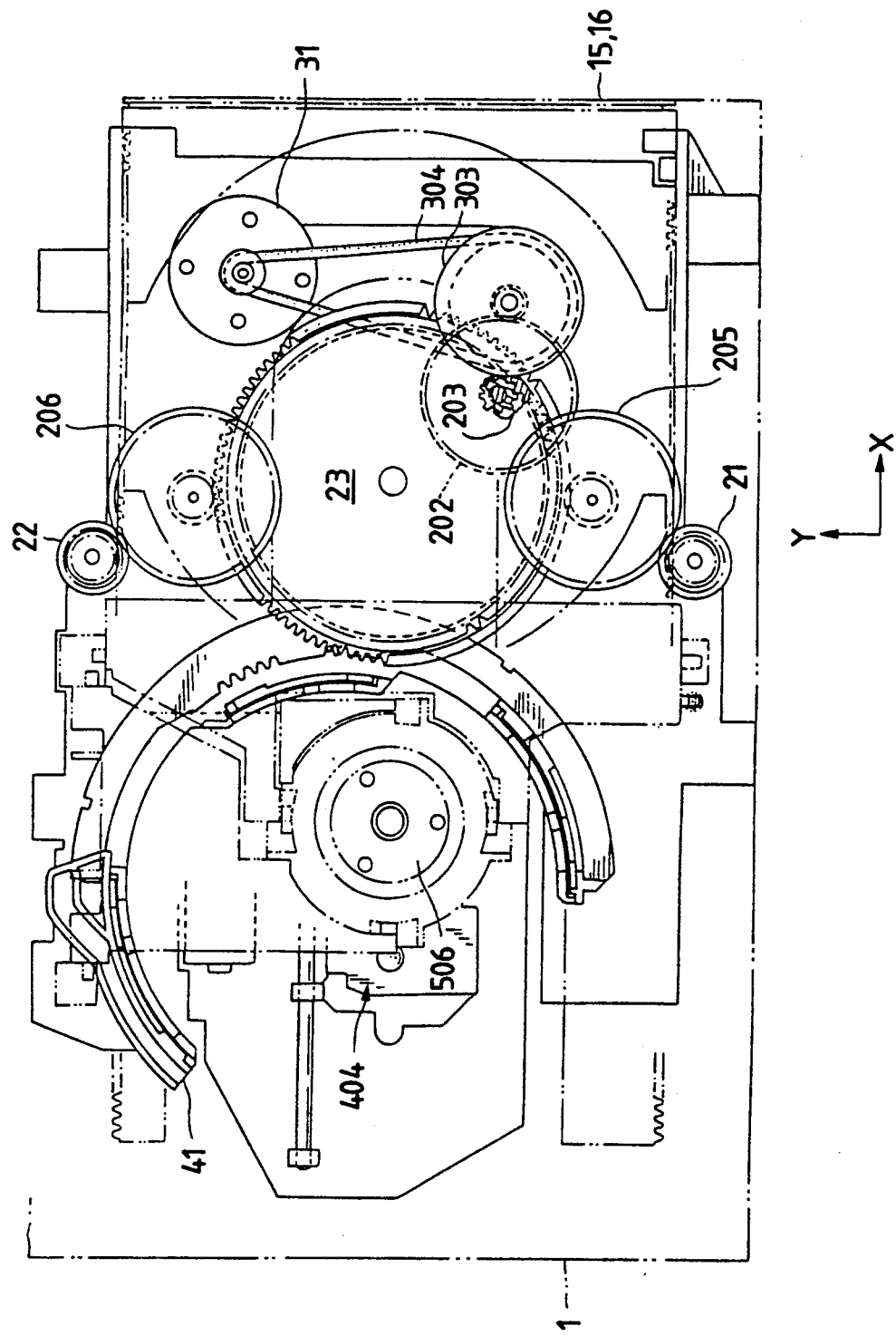
FIGS. 3, 4 and 5 are a plan view, a left side view, and a right side view, respectively, showing essential components of the disk player.

FIGS. 1 through 5 show the entire structure of the disk player according to the invention. As shown in FIGS. 1 and 2, the front wall of a player housing 1, namely, a front panel 2 has a rectangular disk supplying opening 3 which is elongated horizontally. An upper tray 6 and a lower tray 7, on which a large diameter disk 4 or a small diameter disk 5 for reproducing a musical performance, for instance, is detachably placed, may be moved through the disk supplying opening 3 to an eject position J (FIG. 4) outside the player housing 1. In the drawings, the arrows X, Y and Z designate a forward direction, a right direction, and an upward direction, respectively. The disk 4 is a compact disk about 12 cm in diameter, and the disk 5 is a compact disk about 8 cm in diameter, for instance; however, the invention is not limited thereto or thereby. The upper and lower trays 6 and 7 are juxtaposed in such a manner that they are substantially in parallel with the disk bearing surface of a turntable 506 (described later) in the player housing 1. The trays 6 and 7 have large diameter recesses 8 and 9 in which the large diameter disks 4 are to be placed, respectively, and small diameter recesses 10 and 11 in which the small diameter disks 5 are to be placed, respectively, in such a manner that the small diameter recesses 10 and 11 are coaxial with the large diameter recesses 8 and 9, respectively.

As shown in FIG. 1, a pair of upper and lower doors 12 and 13 are swingably provided for the disk supplying opening 3 to close the opening 3. The doors 12 and 13 are opened and closed as the trays 6 and 7 are drawn in and out. A group of switches 14 for operating the disk player is provided on the front panel 2.

In FIGS. 2 through 5, reference number 20 designates a circular gear section which is so designed as to move a plurality of trays, two trays 6 and 7 in the embodiment, to a playing position P where the disk 4 or 5 is played (reproduced) (FIG. 4), a waiting position W which is located in front of the reproducing position P (in the direction of the arrow X) and behind the doors 12 and 13, and to the ejecting position J which is located in front of the doors 12 and 13 successively.

Reference numeral 30 designates a drive section which has an electric motor 31 as a drive source, to drive the circular gear section.

The circular gear section 20 is engaged with a circular cam mechanism 40 to rotate the cam mechanism 40. The circular cam mechanism 40 includes a cam section for moving a pickup section 404 (FIGS. 4 and 5) vertically, which is mounted on a float base 42, in accordance with the position of the disk 4 or 5 in a vertical direction.

The cam section of the circular cam mechanism 40 is used to move a clamper section 50 vertically which is adapted to clamp the disk 4 or 5. In the embodiment, a clamper lifting mechanism 60 has a clamper arm section 61 which supports the clamper section 50, and engages with the cam section of the circular cam mechanism 40, so that, as the circular cam 41 of the circular cam mechanism 40 turns, it swings to move the clamper section 50 vertically.

The upper tray 6 is mounted on an upper sub-tray 15 in such a manner that the trays 6 and 15 are movable relative to each other in forward and backward directions. Similarly, the lower tray 7 is mounted on a lower sub-tray 16 in such a manner that the trays 7 and 16 are movable relative to each other in forward and backward directions. More specifically, first and second pinion gears 21 and 22, which are driven by a circular gear 23 in the circular gear section 20, are engaged with the upper sub-tray 15 and the upper tray 6 and with the lower sub-tray 16 and the lower tray 7, respectively, so that, as the circular gear 23 rotates, the upper sub-tray 15 and the upper tray 6 are moved forwardly or backwardly, while the lower sub-tray 16 and the lower tray 7 are moved forwardly or backwardly.

Figure 6A:
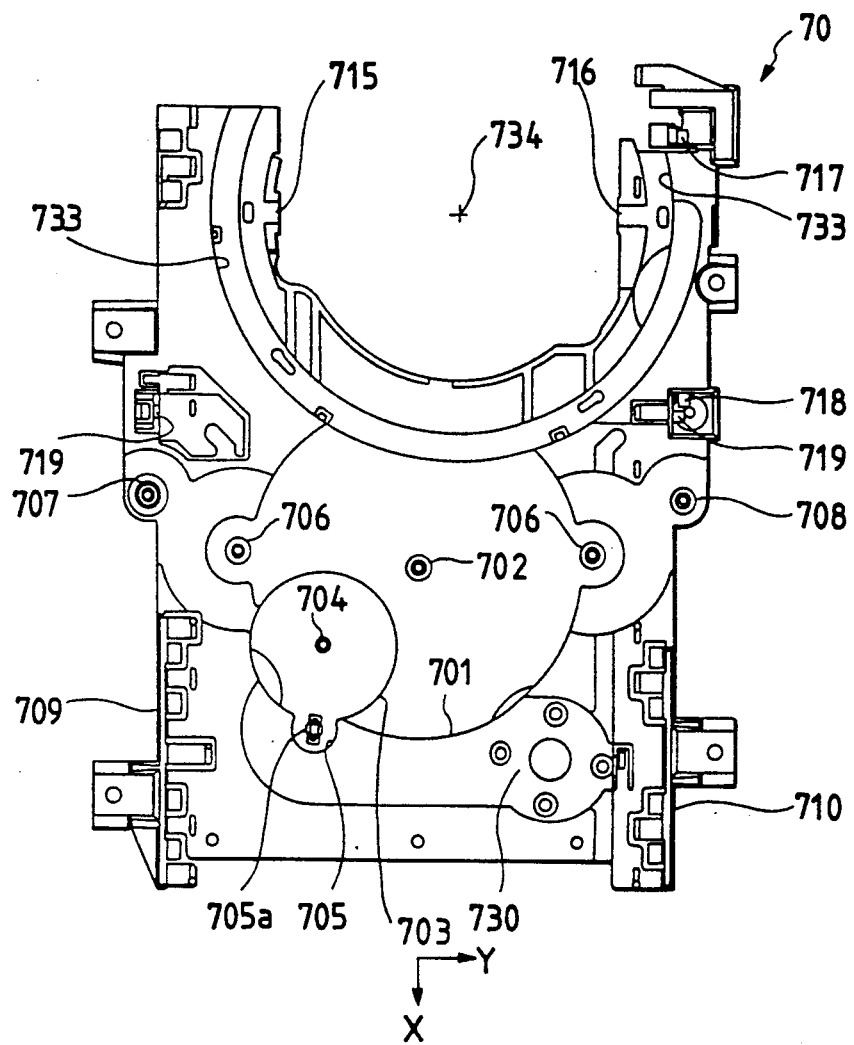
FIGS. 6A, 6B and 6C are a top view, a front view, and a bottom view, respectively, showing a loading base in the disk player.
Figure 6B:
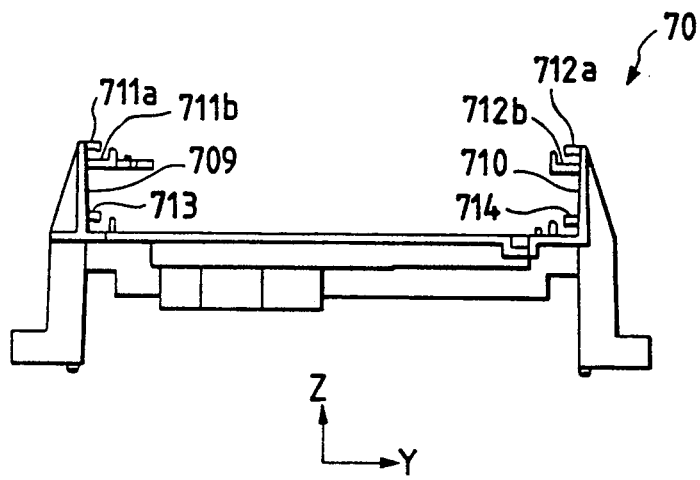
Figure 6C:
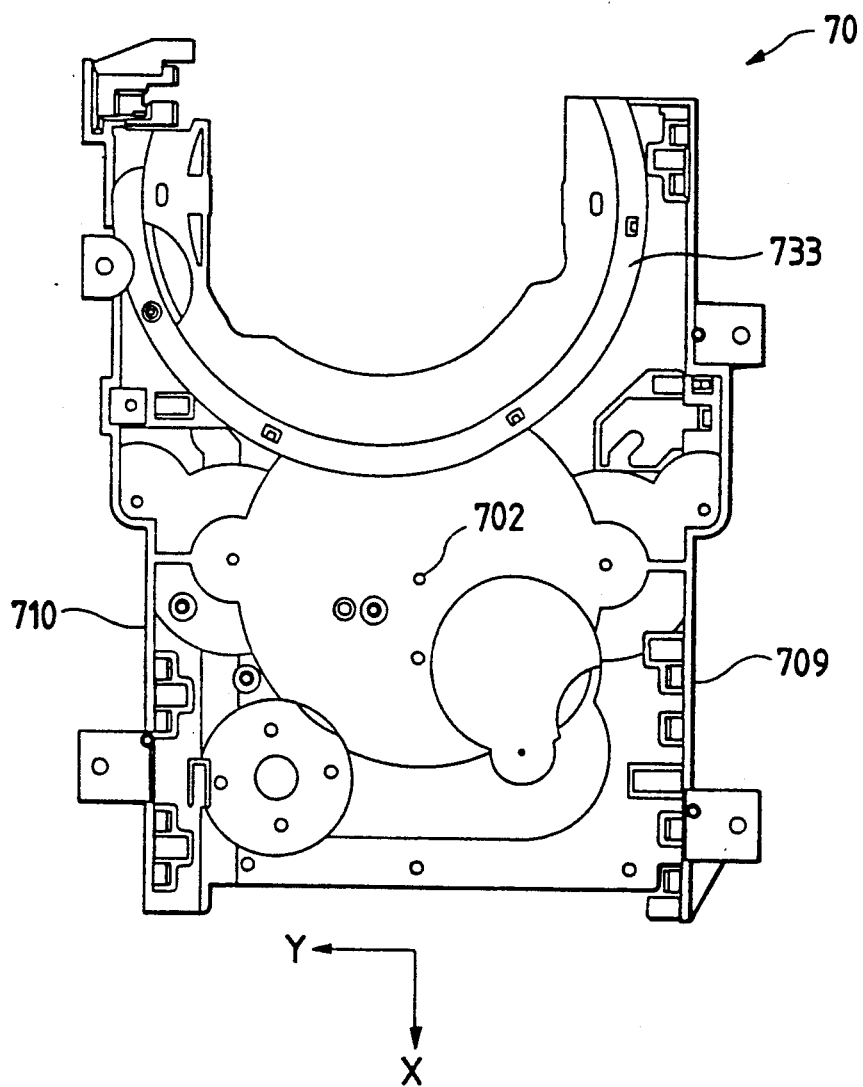
Figure 14A:
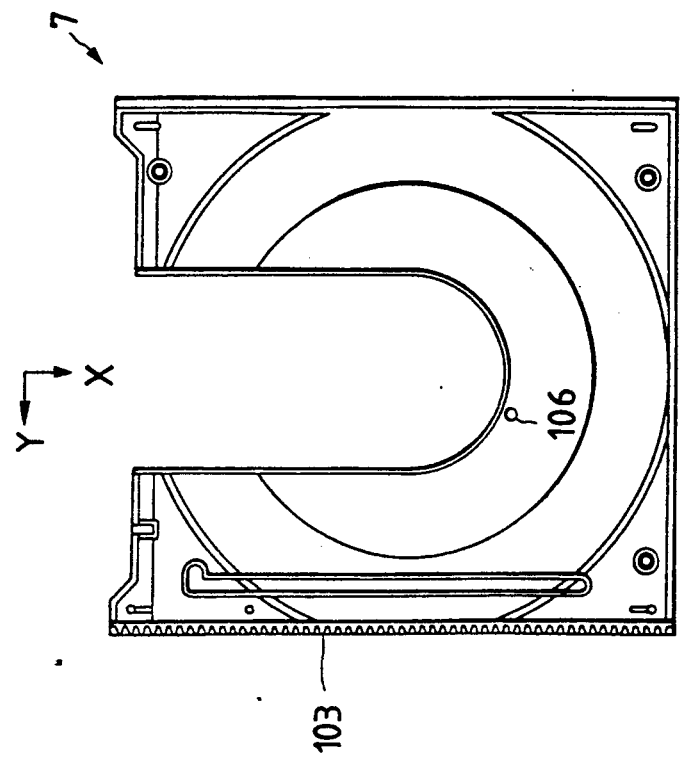
FIG. 14A is a top view of a lower tray.
Figure 14B:
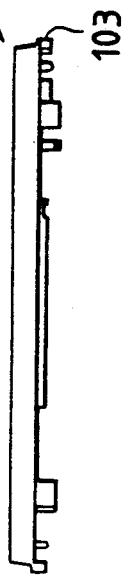
FIG. 14B is a sectional view taken along line XIV—XIV in FIG. 14A, and FIGS. 14C and 14D are a front view and a bottom view of the same, respectively.
Figure 14D:
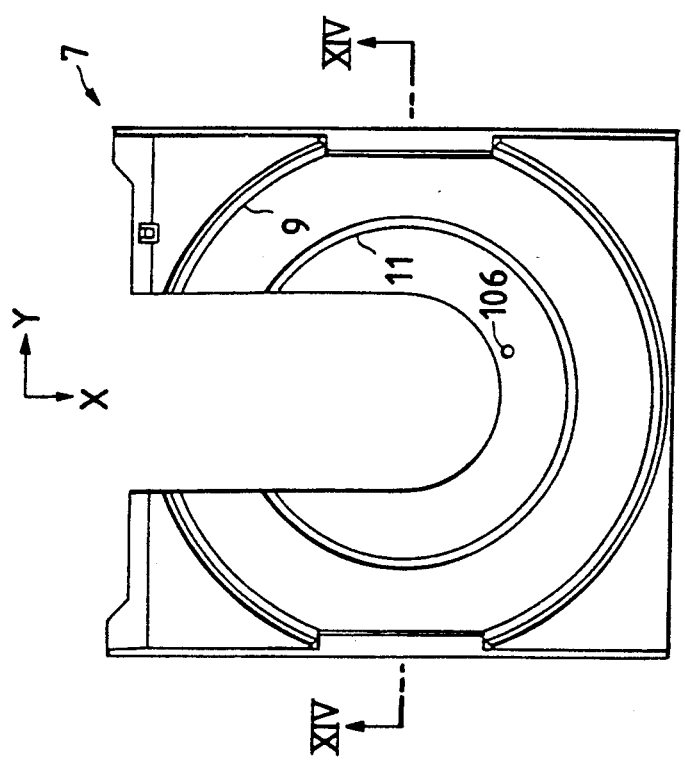
Figure 14C:

The sub-trays 15 and 16, the circular gear section 20, the drive section 30, the circular cam mechanism 40, the clamper section 50, and the clamper lifting mechanism 60 are mounted on a loading base 70 which is fixedly mounted in the player housing 1. The structure of the loading base 70 is as shown in FIGS. 6A through 6C.

Figure 7:
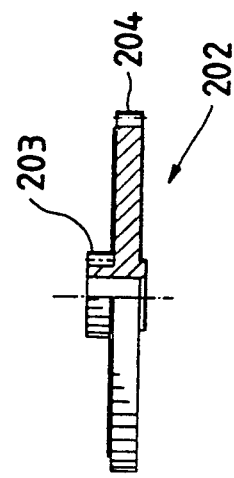
FIG. 7 is an elevation of an idler gear in the disk player, with one half of the gear shown in vertical section.
Figure 8:
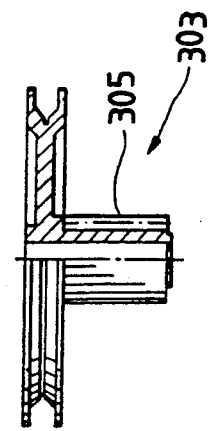
FIG. 8 is also an elevation of a gear pulley in the disk player, with one half of the gear pulley shown in vertical section.
Figure 5:
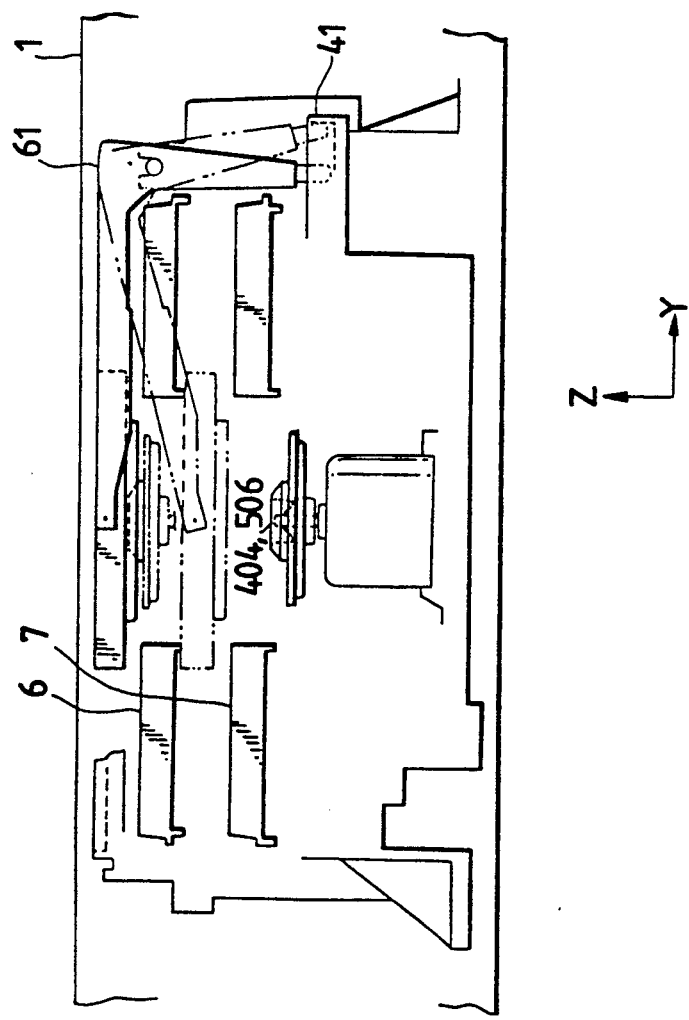

Now, the circular gear section 20 and the drive section 30 for driving the circular gear section 20 will be described in more detail. As shown in FIGS. 2 through 5, the circular gear 23 is rotatably mounted on a shaft 702 in a circular recess 701 (FIGS. 2 and 6A) formed in the loading base 70. An internal gear 201 (FIGS. 2 and 15A) is formed in the lower surface of the circular gear 23. The internal gear 201 thus formed is engaged with a small gear 203 of an idler gear 202 (FIG. 7) which is rotatably mounted on a shaft 704 in a recess 703 formed in the loading base 70. A drive source, namely, the aforementioned electric motor 31 is fixedly mounted on the lower surface of a recess 730 formed in the loading base 70 in such a manner that the output shaft 301 is held extended upwards. An endless belt 304 of rubber is laid over a pulley fixedly mounted on the output shaft 301 of the motor 31 and a gear pulley (FIG. 8) rotatably mounted on a shaft 705a (FIG. 6A) in a recess 705 formed in the loading base 70. The gear 305 of the gear pulley 303 is engaged with a large diameter gear 204 of the idler gear 202. Hence, as the motor 31 rotates, the rotation of the motor is transmitted through the pulley 301 and the endless belt 304 to the gear pulley 303 to rotate the gear pulley 303. The rotation of the gear pulley 303 is transmitted through the gear 305 of the gear pulley 303, the large gear 204 and the small gear 203 of the idler gear 202 to the internal gear 201 of the circular gear 23, to rotate the circular gear 23.

The first pinion gear 21 is as shown in FIGS. 9A through 9C, and the second pinion gear 22 is as shown in FIGS. 10A through 10C. The first and second pinion gears 21 and 22 are rotatably mounted on shafts 707 and 708, respectively, which are protruded from the loading base 70. FIGS. 11A and 11B show follower gears 205 and 206. The follower gear 205 is interposed between the circular gear 23 and the first pinion gear 21, and similarly, the follower gear 206 is interposed between the circular gear 23 and the second pinion gear 22. The follower gears 205 and 206 are rotatably mounted on a pair of shafts 706, respectively, which are protruded from the loading base 70 (FIG. 6A). The follower gear 205 has a small gear 207 which is intermittently engaged with an external gear 208 (described later in detail) of the circular gear 23, and a large gear 209 which is engaged with the lower gear 210 of the first pinion gear 21. Similarly, the follower gear 206 has a small gear 211 which is intermittently engaged with the external gear 208 of the circular gear 23, and a large gear 212 which is engaged with the lower gear 213 of the second pinion gear 22. In the embodiment, the two follower gears 205 and 206 are the same in configuration.

The upper sub-tray 15 (FIGS. 13A through 13C), on the upper surface of which the upper tray 6 (FIGS. 12A through 12D) slides back and forth, is guided by a plurality of supporting pieces while its vertical movement is limited; that is, the upper sub-tray 15 is freely slidable forwardly and backwardly. More specifically, a plurality of supporting pieces 711a and 711b (for instance three supporting pieces) and a plurality of supporting pieces 712a and 712b (for instance three supporting pieces) arranged in the direction of the arrow X are extended inwardly from the upper portions of the inner surfaces of the right and left side walls 710 and 709, respectively, to guide the upper sub-tray 15 in the above-described manner (FIG. 6B). The upper tray 6 and the upper sub-tray 15 have racks 101 and 102 formed in their left sides, respectively. The racks 101 and 102 thus formed are engaged with the upper gear 214 of the first pinion gear 21 or disengaged therefrom. The upper gear 214 is wide enough to engage with the two racks 101 and 102.

The lower sub-tray 16 (FIGS. 13A through 13C), on the upper surface of which the lower tray 7 (FIGS. 14A through 14D) slides back and forth, is guided by a plurality of supporting pieces while its vertical movement is limited; that is, the upper sub-tray 16 is freely slidable forwardly and backwardly. More specifically, a plurality of supporting pieces 713 (for instance three supporting pieces) and a plurality of supporting pieces 714 (for instance three supporting pieces) arranged in the direction of the arrow X are extended inwardly from the lower portions of the inner surfaces of the right and left side walls 710 and 709, respectively, to guide the lower sub-tray 16 in the above-described manner (FIG. 6B). The lower tray 7 and the lower sub-tray 16 have racks 103 and 104 formed in their right sides, respectively. The racks 103 and 104 formed are engagable with the upper gear 215 of the second pinion gear 22 or disengageable therefrom. The upper gear 215 is wide enough to engage with the two racks 103 and 104. In the embodiment, the upper sub-tray 15 and the lower sub-tray 16, as shown in FIGS. 13A and 13B are the same in configuration; however, they may be different in configuration from each other.

Figure 15A:
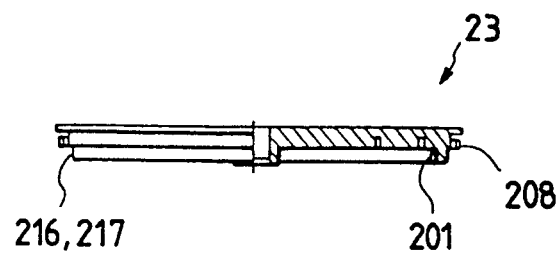
FIGS. 15A and 15B are a front view and a bottom view of a circular gear, respectively.
Figure 15B:
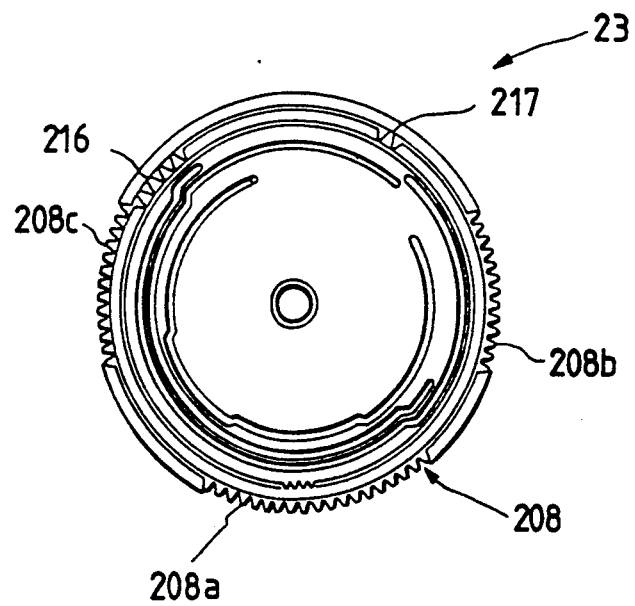
Figure 21A:
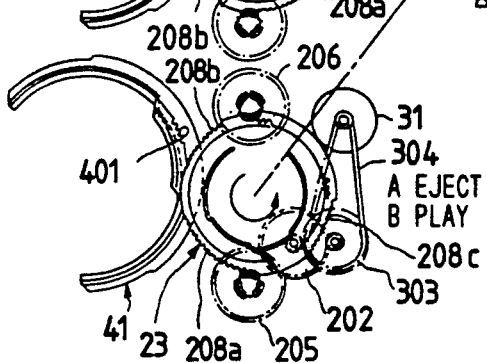
FIGS. 21(a) through (f) are explanatory diagrams for a description of the operation of the disk player according to the invention.
Figure 21B:
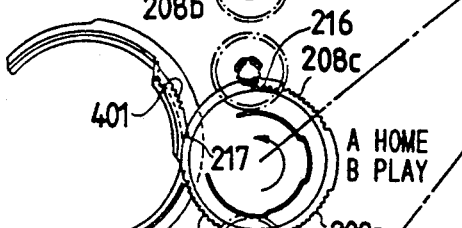
Figure 21C:
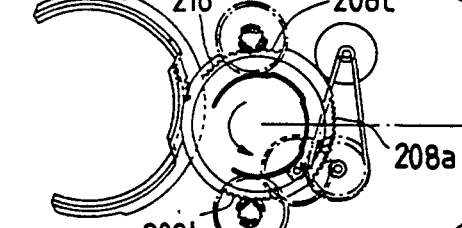
Figure 21D:
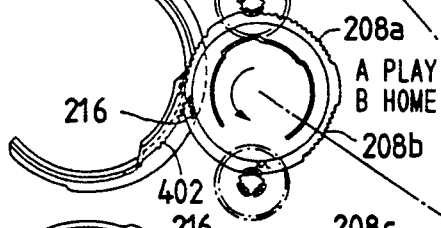
Figure 21E:
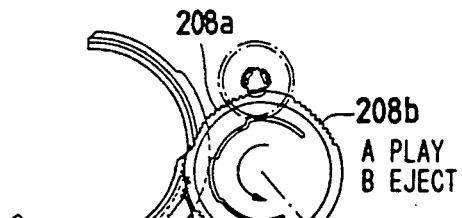
Figure 21F:
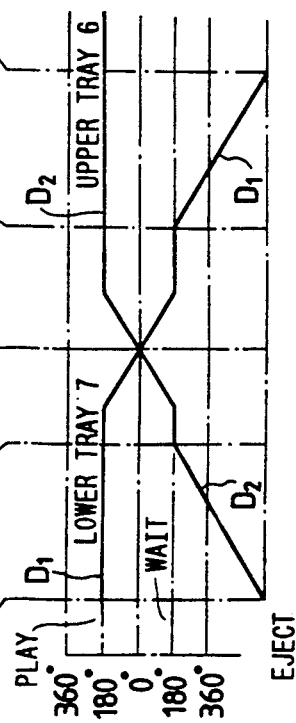

The circular gear 23 will be described with reference to FIGS. 15A and 15B. The internal gear 201 is formed in the periphery of the lower surface of the circular gear 23, as was described before. The internal gear 201 is engaged with the small gear of the idler gear 202 to rotate the circular gear 23. The external gear 208 of the circular gear 23 is made up of gear teeth trains 208a, 208b and 208c arranged at predetermined angular intervals so that the small gears 207 and 211 of the follower gears 205 and 206 engage with the external gear 208 intermittently, thereby to move the sub-trays 15 and 16 and the trays 6 and 7 back and forth. The circular gear 23 further includes gear teeth trains 216 and 217 (FIG. 15B) to intermittently turn the circular cam 41 through a predetermined angle. More specifically, the gear teeth trains 216 and 217 are arranged at predetermined positions so that the gear teeth trains 216 and 217 engage with the gear teeth trains 401 and 402 (FIG. 16A) of the circular cam 41 temporarily, respectively.

Now, the float base 42, which is moved vertically by the rotation of the circular cam 41, will be described with reference to FIGS. 16A through 16H, and 17A through 17D. The circular cam 41 is fitted in a circular recess 733 (FIG. 6A) formed in the loading base 70 in such a manner that it is rotatable around the center 734 of the circular recess 733. The gear teeth trains 401 and 402 of the circular cam 41 are temporarily engaged with the gear teeth trains 216 and 217 of the circular gear 23, respectively, so that the circular cam 41 is intermittently turned around the center 734. Three V-shaped cam grooves 405 (FIG. 16H) are formed in the inner circular wall 403 (FIG. 16A) of the circular cam 41. The cam grooves 405 serve as positive motion cams which form a cam section to vertically move the pickup section 404 and a turntable 506 (FIGS. 4 and 5) fixedly mounted on the float base 42.

The float base 42 includes four supporting pins 406 extended upwardly therefrom. The pins 406 are used to mount the pickup section 404 and the turntable 506. The float base 42 further includes guide pieces 407, 408 and 409 extended sidewardly therefrom. The guide pieces 407 through 409 are slidably engaged with the three cam grooves 405 of the circular cam 41, and the right and left guide piece 408 and 407 are vertically movably engaged with elongated grooves 715 and 716 which are formed in the loading base 70 in such a manner that the elongated grooves are extended vertically. Hence, the float base 42 is allowed only to move vertically, and is not rotatable.

The float base 42 further includes a protruded piece 410 at the front end which is extended upwardly from the float base. The protruded piece 410 is used as follows: when the float base 42 is at the upper position, the protruded piece 410 is inserted into a positioning hole 105 (FIG. 12A) of the upper tray 6 or a positioning hole 106 (FIG. 14A) of the lower tray 7 which is at the playing position, so as to maintain the relative position of the tray 6 or 7 and the pickup section 404 and the turntable 506 unchanged during playing.

The circular cam 41 has a cam groove 411 in the upper right portion. The cam groove 411 forms a positive motion cam in the cam section which engages with the clamper lifting mechanism 60 to lift the clamper section 50. The cam groove 411 is made up of a small width groove 411a, and a large width groove 411b which is extended radially outwardly from the small width groove 411a.

Now, the clamper lifting mechanism 60 adapted to move the clamper section 50 vertically will be described with reference to FIGS. 18A through 18C, 19A through 19E, and 20A and 20B.

In the clamper lifting mechanism 60, the clamper arm section 61 includes a first clamper arm 601, and a second clamper arm 602. The first clamper arm 601 has a pair of front and rear supporting shafts 603 and 603 which are engaged with shaft supporting recesses 717 and 718 (FIG. 6A) formed in the loading base 70, so that the first clamper arm 601 is swingable about the supporting shafts 603 (FIG. 18B). The first clamper arm 601 further includes a pair of front and rear supporting pieces 604, which are extended towards each other to support the clamper holder 501 of the clamper section 50. More specifically, in order to support the clamper holder 501, the supporting pieces 604 are detachably and swingably engaged with a pair of front and rear grooves 502 (FIG. 20A) of the clamper holder 501 which is accommodated in a circular opening 605 of the clamper arm section 61.

The first clamper arm 601 further comprises an engaging piece 606, which is extended downwards in such a manner as to slidably engage with the cam groove 411 of the circular cam 41. As the circular cam 41 turns, the engaging piece 606 is reciprocated between the small width groove 411a and the large width groove 411b, so that the first clamper arm 601 is swung about the supporting shafts 603.

As shown in FIGS. 19A through 19E, the second clamper arm 602 includes right and left supporting shafts 607, which are engaged with a pair of shaft supporting recesses 719 (FIG. 6A) so as to allow the second clamper arm 602 to swing about the supporting shafts 607 (FIG. 19C). In order to cooperate with the first clamper arm 601 to support the clamper holder 501, the second clamper arm 602 further includes right and left supporting pieces 608 which are extended towards each other. The supporting pieces 608 are detachably and swingably engaged with a pair of grooves 503 (FIGS. 20A and 20B) formed in the clamper holder 501, thus supporting the clamper holder 501. Hence, as the clamper holder 501 is moved vertically by the swinging of the first clamper arm 601, the second clamper arm 602 is swung about the supporting shafts 607 while maintaining the clamper holder 501 horizontal. The second clamper arm 602 is kept urged downwardly by a tension spring 611 (FIG. 2) which is connected between a locking piece 610 (FIGS. 19A and 19B) and the loading base 70.

As shown in FIG. 2, an annular clamper 505 is secured to the clamper holder 501 with a disk member 504. The turntable 506, which incorporates a permanent magnet and is mounted on the flat base 42, is moved to and from the clamper 505, to hold between the clamper 505 and the turntable 506 the disk 4 or 5 placed on the upper tray 6 or lower tray 7, thereby to turn it.

Figure 4:
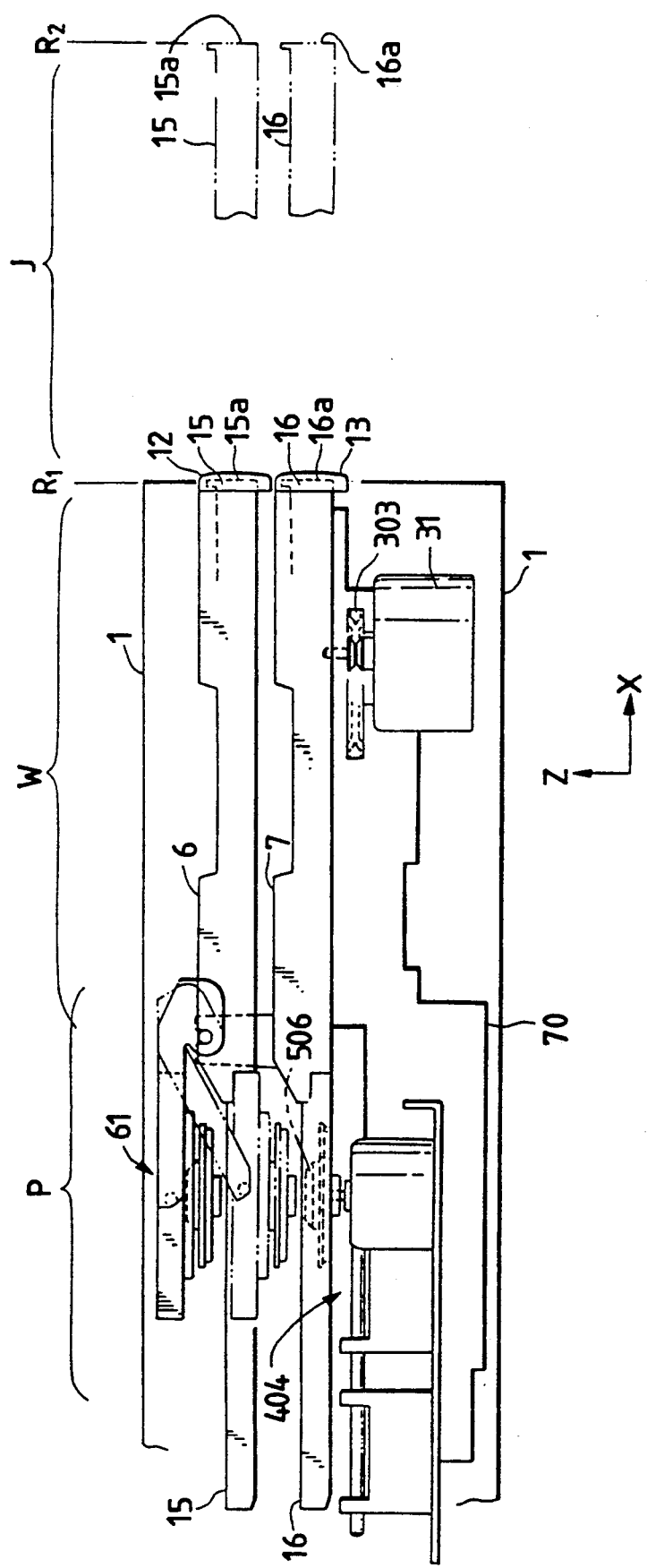

The operation of the disk player thus constructed will be described with reference to FIG. 21 and FIGS. 2 through 5. In FIG. 4, reference character $R_1$ designates the position of each of the front ends 15a and 16a of the sub-trays 15 and 16 (in the playing or waiting state); and $R_2$, the position of each of the front ends 15a and 16a of the sub-trays 15 and 16 (in the ejecting state). It is assumed that the disk 4 or 5 on the lower tray 7 is placed in play state being set at the playing position P while the disk 4 or 5 on the upper tray 6 is set at the ejecting position J, before the relevant components operate in association with the counterclockwise rotation of the circular gear 23 as shown in the parts (a) through (e) of FIG. 21. The part (f) of FIG. 21 is an operating chart for a description of the operation of the disk player. In the part (f) of FIG. 21, reference characters $D_1$ and $D_2$ designate curves indicating the changes in position of the lower tray 7 and the upper tray 6, respectively.

Step (a)

In the first step (a) (FIG. 21), the circular gear 23 is at the end position in the clockwise direction, the circular cam 41 is at the end position in the counterclockwise direction, the front end 15a of the upper sub-tray 15 is at the position $R_2$, and the upper tray 6 is at the ejecting position J. In addition, the front end 16a of the lower sub-tray 16 is at the position $R_1$, and the lower tray 7 is at the playing position P. In this case, the engaging piece 606 of the first clamper arm 601 is engaged with the large width groove 411b forming the cam groove 411, and therefore the first clamper arm 601 is inclined, and accordingly the clamper holder 501 of the clamper section 50 is at the lower position. The second clamper arm 602, being driven by the first clamper arm 601, is also inclined. On the other hand, the guide pieces 407, 408 and 409 of the float base 42 are at the positions $V_1$ in the V-shaped cam grooves 405 of the circular cam 41 (FIG. 16H), and therefore the disk 4 or 5, which has been placed on the lower tray 7 and held between the turntable 506 and the clamper 505, is located above the upper surface of the lower tray 7. This is to smoothly rotate the disk 4 or 5 with the turntable 506. Accordingly, in step (a) the disk 4 or 5 of the lower tray 7 is placed in a play state.

Step (a) to Step (b)

The switches 14 (FIG. 1) are operated to continuously rotate the motor 31. The rotation of the motor 31 is transmitted through the pulley 301, the endless belt 304, the gear pulley 303 and the idler gear 202 to the circular gear 23 to continuously rotate the circular gear 23 counterclockwise. In this operation, the gear teeth train 208a of the external gear 208 of the circular gear 23 is engaged with the follower gear 205, so that the sub-tray 15 is moved backwardly with the aid of the first pinion gear 21 engaged with the follower gear 205. After the front end 15a of the upper sub-tray 15 is moved from the position $R_2$ to the position $R_1$, the gear teeth train 208a is disengaged from the follower gear 205. In this case, the upper tray 6 on the upper sub-tray 15 is set at the waiting position W. Step (b) is as described above (the part (b) of FIG. 21).

Step (b) to Step (c)

As the circular gear 23 is further turned, the gear teeth train 217 of the circular gear 23 is engaged with the gear teeth train 402 of the circular cam 41, so that the circular cam 41 is turned clockwise through a small angle. As a result, the guide pieces 407, 408 and 409 of the float base 42, which are engaged with the cam grooves 405 of the circular cam 41, are moved downwardly to the positions $v_2$ (FIG. 16H), so that the turntable 506 and the pickup section 404 mounted on the float base 42 are moved downwardly from the disk 4 or 5. On the other hand, the engaging piece 606, which is extended downwardly from the lower surface of the first clamper arm 601 in such a manner as to engage with the cam groove 411 of the circular cam 41, is moved from the large width groove 411b to the small width groove 411a. As a result, the first clamper arm 601 is swung clockwise (as viewed from front), and accordingly the second clamper arm 602 is swung counterclockwise (as viewed from the right) against the elastic force of the spring 611, to raise the clamper holder 501.

As the circular gear 23 is further turned, the left follower gear 205 is turned by the gear teeth train 208b of the circular gear 23, so that the upper tray 6 is moved from the waiting position W to the playing position P with the aid of the first pinion gear 21. In this operation, the right follower gear 206 is turned by the gear teeth train 208c of the circular gear 23, so that the lower tray 7 is moved from the playing position P to the waiting position W with the aid of the second pinion gear 22. In this case, the lower sub-tray 16 is not moved; that is, the front end 16a is held at the position $R_1$. Step (c) is as described above.

Step (c) to Step (d)

When the upper tray 6 and the lower tray 7 are set at the playing position P and the waiting position W, respectively, the gear teeth train 208b and 208c are disengaged from the follower gears 205 and 206. Immediately after this disengagement, the gear teeth train 216 of the circular gear 23 is engaged with the gear teeth train 401 of the circular cam 41, so that the circular cam 41 is turned clockwise through a predetermined angle. As a result, the guide pieces 407, 408 and 409 of the float base 42, engaged with the V-shaped cam grooves 405 of the circular cam 41, are moved upwardly to the positions $v_3$ (FIG. 16H). Accordingly, the pickup section 404 (FIGS. 4 and 5) and the turntable 506 mounted on the float base 42 are moved upwardly, so that the disk 4 or 5 is held above the upper tray 6 by the clamper 505 and the turntable 506, so as to be played. In this operation, the protruded piece 410 of the float base 42 is inserted into the positioning hole 105 of the upper tray 6, so as to retain the upper tray 6. Step (d) is as described above.

Step (d) to Step (e)

As the circular gear is further turned, the gear teeth train 208a of the circular gear 23 is engaged with the follower gear 206, so that the lower sub-tray 16 is moved forwardly with the aid of the second pinion gear 22. The lower sub-tray 16 is moved while supporting the lower tray 7 until the front end 16a is moved from the position $R_1$ to the position $R_2$, so that the lower tray 7 is moved from the waiting position W to the ejecting position J. Thus, the disk 4 or 5 of the upper tray 6 is ready to be played, and the lower tray 7 is at the ejecting position. This is step (e). As is apparent from comparison of step (e) with step (a), the upper and lower disks 4 or 5 are replaced with each other. By operating the group of switches 14 (FIG. 1) to input a signal to rotate the motor 31 in the reverse direction, the above-described operations, steps (a) through (e) may be carried out in the reverse order.

In the above-described embodiment, the disk trays are laid in two layers, however, the invention is not limited thereto or thereby. That is, the technical concept of the invention can be equally applied to a disk player having disk trays laid in more than two layers to play disks successively.

As was described above, in the disk payer of the invention, the circular gear section and the circular cam mechanism engaged with the circular gear section are provided to move a plurality of disk trays and the pickup section. Therefore, the disk player of the invention dispenses with the rack members which are arranged in the conventional disk player in the front-to-rear direction. In addition, the disk player of the invention is greatly reduced in length when compared with the conventional disk player; that is, it is more compact in construction, and smaller in the number of components.

What is claimed is:

1. A disk player comprising:
   a player housing;
   a pickup section for reproducing information from a disk disposed within said player housing;
   a turntable disposed within said player housing and having a disk bearing surface;
   a plurality of movable trays disposed in said player housing and having surfaces on which corresponding disks are detachably placed, said trays being juxtaposed so that the surfaces of said trays are substantially in parallel with the disk bearing surface of the turntable;
   a circular gear section for moving each of said plurality of trays to a playing position, a waiting position, and an eject position;
   a drive section for rotating said circular gear section; and
   a circular cam mechanism engaged with said circular gear section so as to be turned thereby, said circular cam mechanism having a cam section for moving said pickup section vertically in accordance with the position of a corresponding one of said disks at said playing position.

2. The disk player as claimed in claim 1, wherein said circular gear section comprises a circular gear and wherein said trays are movably mounted on sub-trays, respectively; said disk player further comprising pinion gears which are rotated by said circular gear and are engaged with said trays and sub-trays so that said trays and sub-trays are moved as said circular gear is rotated.

3. The disk player as claimed in claim 1, further comprising a clamper section for clamping a corresponding one of said disks, said cam section of said circular cam mechanism moves said clamper section vertically so as to clamp a corresponding one of said disks.

4. The disk player as claimed in claim 2, further comprising a clamper section for clamping a corresponding one of said disks, said cam section of said circular cam mechanism moves said clamper section vertically so as to clamp a corresponding one of said disks.

5. The disk player as claimed in claim 3, further comprising a clamper lifting mechanism for moving said clamper section vertically, said clamper lifting mechanism comprising a clamper arm section which supports said clamper section and engages with said cam section of said circular cam mechanism, said circular cam mechanism including a circular cam, so that, as said circular cam turns, said clamper arm section is swung to move said clamper section vertically.

* * * * *